(12) United States Patent
Burke et al.

(10) Patent No.: US 12,184,938 B2
(45) Date of Patent: *Dec. 31, 2024

(54) USING MANIFEST FILES TO DETERMINE EVENTS IN CONTENT ITEMS

(71) Applicant: Comcast Cable Communications, LLC, Philadelphia, PA (US)

(72) Inventors: Mike Burke, Denver, CO (US); Bryan Pauk, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,036

(22) Filed: Jun. 6, 2023

(65) Prior Publication Data

US 2023/0319362 A1    Oct. 5, 2023

Related U.S. Application Data

(63) Continuation of application No. 17/667,101, filed on Feb. 8, 2022, now Pat. No. 11,711,587, which is a continuation of application No. 16/102,075, filed on Aug. 13, 2018, now Pat. No. 11,277,665.

(51) Int. Cl.
*H04N 21/472* (2011.01)
*H04N 5/45* (2011.01)
*H04N 21/433* (2011.01)
*H04N 21/436* (2011.01)
(Continued)

(52) U.S. Cl.
CPC ......... *H04N 21/47217* (2013.01); *H04N 5/45* (2013.01); *H04N 21/4334* (2013.01); *H04N 21/436* (2013.01); *H04N 21/47214* (2013.01); *H04N 21/4722* (2013.01); *H04N 21/8456* (2013.01)

(58) Field of Classification Search
CPC ............... H04N 21/47217; H04N 5/45; H04N 21/4334; H04N 21/436; H04N 21/47214; H04N 21/4722; H04N 21/8456; H04N 21/4755; H04N 21/8543; G06F 16/748
See application file for complete search history.

(56) References Cited

U.S. PATENT DOCUMENTS

2010/0199299 A1   8/2010   Chang et al.
2012/0047542 A1   2/2012   Lewis et al.
2013/0091249 A1   4/2013   McHugh et al.
(Continued)

FOREIGN PATENT DOCUMENTS

WO    WO-2016162732 A1 * 10/2016

OTHER PUBLICATIONS

The structure of an Mpeg-Dash MPD, Brendan Long, dated Mar. 20, 2015, retrieved from https://www.brendanlong.com/the-structure-of-an-mpeg-dash-mpd.html.
(Continued)

*Primary Examiner* — Fernando Alcon
(74) *Attorney, Agent, or Firm* — Banner & Witcoff, Ltd.

(57) ABSTRACT

Systems, methods, apparatuses are described for monitoring events in a plurality of different services. A system may monitor manifest files for one or more content items. Manifest files may contain manifest file tags indicating events. Events may be detected, and a switch from one content item to another content item, based on customized user priority preferences, may be caused.

30 Claims, 9 Drawing Sheets

(51) Int. Cl.
*H04N 21/4722* (2011.01)
*H04N 21/845* (2011.01)

(56) References Cited

U.S. PATENT DOCUMENTS

| | | | |
|---|---|---|---|
| 2014/0207964 A1 | 7/2014 | Philpott et al. | |
| 2014/0229976 A1 | 8/2014 | Ma et al. | |
| 2014/0245346 A1 | 8/2014 | Cheng et al. | |
| 2014/0359076 A1 | 12/2014 | Wan et al. | |
| 2014/0359152 A1 | 12/2014 | Heng | |
| 2015/0261600 A1* | 9/2015 | Iturralde | H04N 21/8456 714/747 |
| 2016/0029054 A1 | 1/2016 | Waisanen et al. | |
| 2016/0269459 A1 | 9/2016 | Harden et al. | |
| 2016/0323606 A1 | 11/2016 | Mao et al. | |
| 2017/0310722 A1 | 10/2017 | Chen et al. | |
| 2017/0332113 A1 | 11/2017 | Haritaoglu et al. | |
| 2017/0374123 A1* | 12/2017 | Asarikuniyil | H04N 21/812 |
| 2018/0063253 A1 | 3/2018 | Hellkvist et al. | |
| 2018/0077420 A1 | 3/2018 | Dunham et al. | |
| 2018/0255116 A1 | 9/2018 | Kaufman et al. | |
| 2018/0343482 A1 | 11/2018 | Loheide et al. | |
| 2019/0132627 A1* | 5/2019 | Loheide | H04N 21/2668 |
| 2020/0053430 A1 | 2/2020 | Burke et al. | |
| 2020/0068232 A1* | 2/2020 | Lipczynski | H04N 21/25883 |
| 2020/0204834 A1* | 6/2020 | Loheide | H04N 21/23614 |
| 2020/0213645 A1 | 7/2020 | Sodagar | |
| 2021/0211748 A1* | 7/2021 | Terem | H04N 21/25883 |
| 2021/0235332 A1 | 7/2021 | Schmidt et al. | |
| 2021/0297713 A1* | 9/2021 | Loheide | H04N 21/2668 |
| 2021/0409796 A1* | 12/2021 | McGilvray | H04L 65/80 |
| 2022/0086536 A1* | 3/2022 | Pressnell | H04N 21/6377 |
| 2022/0167058 A1* | 5/2022 | Burke | H04N 21/4334 |
| 2022/0303598 A1* | 9/2022 | Pansare | H04N 21/8456 |

OTHER PUBLICATIONS

Dec. 12, 2019—European Extended Search Report—EP 19191441.5.

"Web-native Video Live Streaming", Luigi Lo Iacono, dated Apr. 20, 2014, retrieved from http://wikicfp.com/cfp/servlet/event.showcfp?eventid=32237.

"Design of an integrated web browser for digital TVs", Soosun Cho, Advanced Communication Technology, dated Feb. 21, 2005.

Jul. 7, 2021—European Office Action—EP 19191441.5

* cited by examiner

```
#EXTM3U
#EXT-X-TARGETDURATION:10
#EXT-X-VERSION:3                            ———— 305
#EXT-X-MEDIA-SEQUENCE:0
#EXT-X-PLAYLIST-TYPE:LINEAR

#EXTINF:9.97667  ———— 310
fileSequence0.ts
                                 ———— 315
#EXTINF:9.97667,
fileSequence1.ts
                                      ———— 320
#EXTINF:9.97667,
fileSequence2.ts
                                   ———— 325
#EXTINF:9.97667, Walk, 3.214 ————
fileSequence3.ts

#EXT-X-SCTE35: TYPE="39", CUE="/DBjAAARuPzHAP/wBQb+AAAAAABNAktDVUVJYgAIJn//  ———— 330
AABSZcAJN1NJR05BTDpRemd4T0VSRU5EVXRNek00UXkwME5qYzVMVUUwT0RVdFFVTXlSVEF6T0VFMk16TTI2
AADW2s7A"

#EXTINF:9.97667,     ———— 335
fileSequence4.ts

#EXTINF:9.97667,     ———— 340
fileSequence5.ts
                                        ———— 345
#EXTINF:9.97667,Scoring Play, 5.012 ————
fileSequence6.ts

#EXTINF:9.97667,     ———— 350
fileSequence7.ts
                                                             ———— 355
#EXT-X-SCTE35: TYPE="39", CUE="/DBjAAAUZYqZAP/wBQb+AAAAAABNAktDVUVJYgAIQ3//
AABSZcAJN1NJR05BTDpPRGczUkVJNVJVRXRPVUpEUXkwME9EVXlMVGt3TmtVdE5rRkVOVEEwUkRCR04wSkQ2
AACVFkcl"

#EXTINF:9.97667,    ———— 360
fileSequence8.ts

#EXTINF:9.97667,    ———— 365
fileSequence9.ts
                                       ———— 370
#EXTINF:9.97667, Home Run, 7.038 ————
fileSequence10.ts

#EXT-X-ENDLIST  ———— 375
```

| Rockies Baseball Game Manifest File 300 | Cardinals Baseball Game Manifest File 405 | Nationals Baseball Game Manifest File 406 |
|---|---|---|
| Manifest File Entry 310 | Manifest File Entry 410 | Manifest File Entry 411 |
| Manifest File Entry 315 | Manifest File Entry 415 | Manifest File Entry 416 Double Play |
| Manifest File Entry 320 | Manifest File Entry 420 | Manifest File Entry 421 |
| Manifest File Entry 325 Walk | Manifest File Entry 425 Insertion Opportunity | Manifest File Entry 426 Home Run |
| Manifest File Entry 330 Insertion Opportunity | Manifest File Entry 430 | Manifest File Entry 431 |
| Manifest File Entry 335 | Manifest File Entry 435 | Manifest File Entry 436 |
| Manifest File Entry 340 | Manifest File Entry 440 | Manifest File Entry 441 |
| Manifest File Entry 345 Scoring Play | Manifest File Entry 445 | Manifest File Entry 446 |
| Manifest File Entry 350 | Manifest File Entry 450 | Manifest File Entry 451 |
| Manifest File Entry 355 Insertion Opportunity | Manifest File Entry 455 | Manifest File Entry 456 |
| Manifest File Entry 360 | Manifest File Entry 460 | Manifest File Entry 461 |
| Manifest File Entry 365 | Manifest File Entry 465 | Manifest File Entry 466 |
| Manifest File Entry 370 Home Run | Manifest File Entry 470 | Manifest File Entry 471 |

Figure 4

USING MANIFEST FILES TO DETERMINE EVENTS IN CONTENT ITEMS

CROSS-REFERENCES

This application is a continuation of U.S. application Ser. No. 17/667,101, filed on Feb. 8, 2022, which is a continuation of U.S. application Ser. No. 16/102,075, filed Aug. 13, 2018 and now U.S. Pat. No. 11,277,665, each of which is hereby incorporated by reference in its entirety.

BACKGROUND

A variety of content items may be provided to a user. However, while a baseball fan may watch one baseball game that is being transmitted, that same fan may like to know if an interesting event, such as a home run, occurs in a different game that is being transmitted. Therefore, the user may desire a system that monitors multiple content items, such as baseball games, at once. However, as the number of sources of content increases, the number of content items provided to the user may increase as well, and sometimes even exponentially. Processing all of these content items to identify events of interest may strain the resources of a network.

SUMMARY

The following summary presents a simplified summary of certain features. This summary is not an extensive overview, and is not intended to identify key or critical elements. The following summary merely introduces certain features in a simplified form as a prelude to the more detailed description.

Systems, methods, apparatuses are described for monitoring events in a plurality of different services. A user device may automatically detect if an event of interest occurs in content that is different from content the user may currently be watching. A server may monitor content items and create manifest files for the content items. The manifest files may contain information indicating events that are occurring in a particular segment file. The server may send these manifest files to the user device. The user device may monitor manifest files for the various services. If an event indicator is detected by the user device, the user device may jump to the content indicated by the event indicator.

BRIEF DESCRIPTION OF THE DRAWINGS

Some features herein are illustrated by way of example, and not by way of limitation, in the accompanying drawings. In the drawings, like numerals reference similar elements between the drawings.

FIG. 3 shows an example HTTP Live Streaming (HLS) manifest file.

FIG. 4 shows simplified examples of manifest files.

DETAILED DESCRIPTION

In the following description, reference is made to the accompanying drawings, which form a part hereof, and in which are shown various examples of how the disclosure may be practiced. Other examples may be utilized, and structural or functional modifications may be made, without departing from the scope of the present disclosure.

Figure 1:
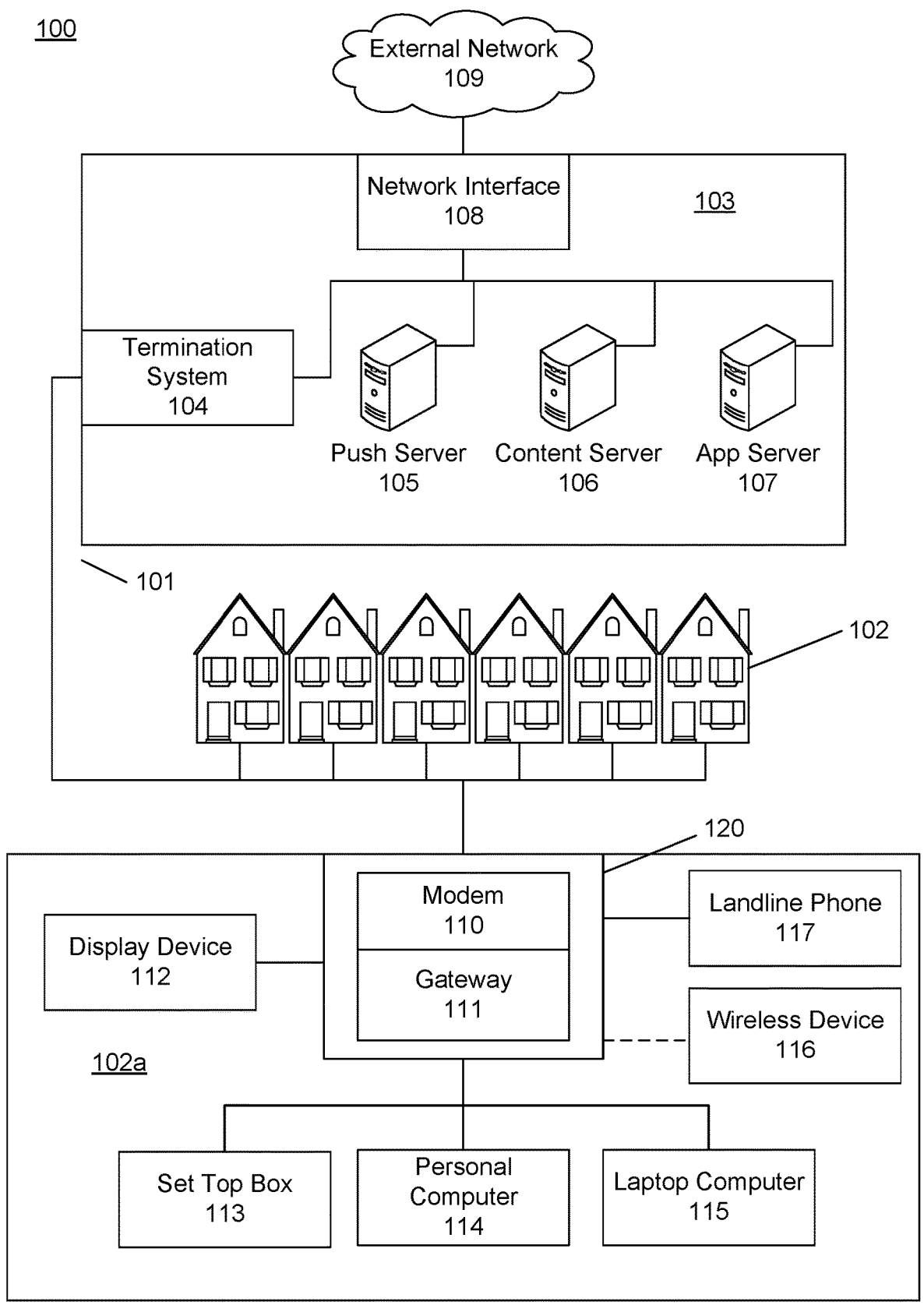
FIG. 1 shows an example information distribution network.

FIG. 1 shows an example communication network 100 on which features described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

There may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-107. The interface 104 may be as specified in a standard, such as the Data Over Cable Service Interface Specification (DOCSIS) standard, published by Cable Television Laboratories, Inc. (a.k.a CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. These networks 109 may transmit content to the local office 103 via a plurality of variable size, fixed duration video fragments. Additionally, and/or alternatively, these networks 109 may transmit content to the local office 103 via a plurality of variable size, variable duration video fragments. The network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. The local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate, retrieve and receive requested content, to encrypt the content, and to initiate delivery by streaming of the content to the requesting user or device. The content may comprise a plurality of fixed size, variable duration video fragments. The local office 103 may include a load balancer (not illustrated) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on TOMCAT/MYSQL, OSX, BSD, UBUNTU, REDHAT, HTML5, JAVASCRIPT, AJAX, or COMET. The application server 107 may be responsible for collecting content listings information and generating a data download for electronic program guide listings. The application server 107 may be responsible for monitoring user viewing habits and collecting that information for use in selecting advertisements. The application server 107 may be responsible for formatting and inserting advertisements in a video stream being transmitted to the premises 102. Although shown separately, one of ordinary skill in the art will appreciate that the push server 105, the content server 106 and the application server 107, may be combined. Further, here the push server 105, content server 106, and the application server 107 are shown generally, and it will be understood that they may each contain memory storing computer executable instructions to cause a processor to perform steps described herein and/or memory for storing other data.

An example premise 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone—DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

Figure 2:
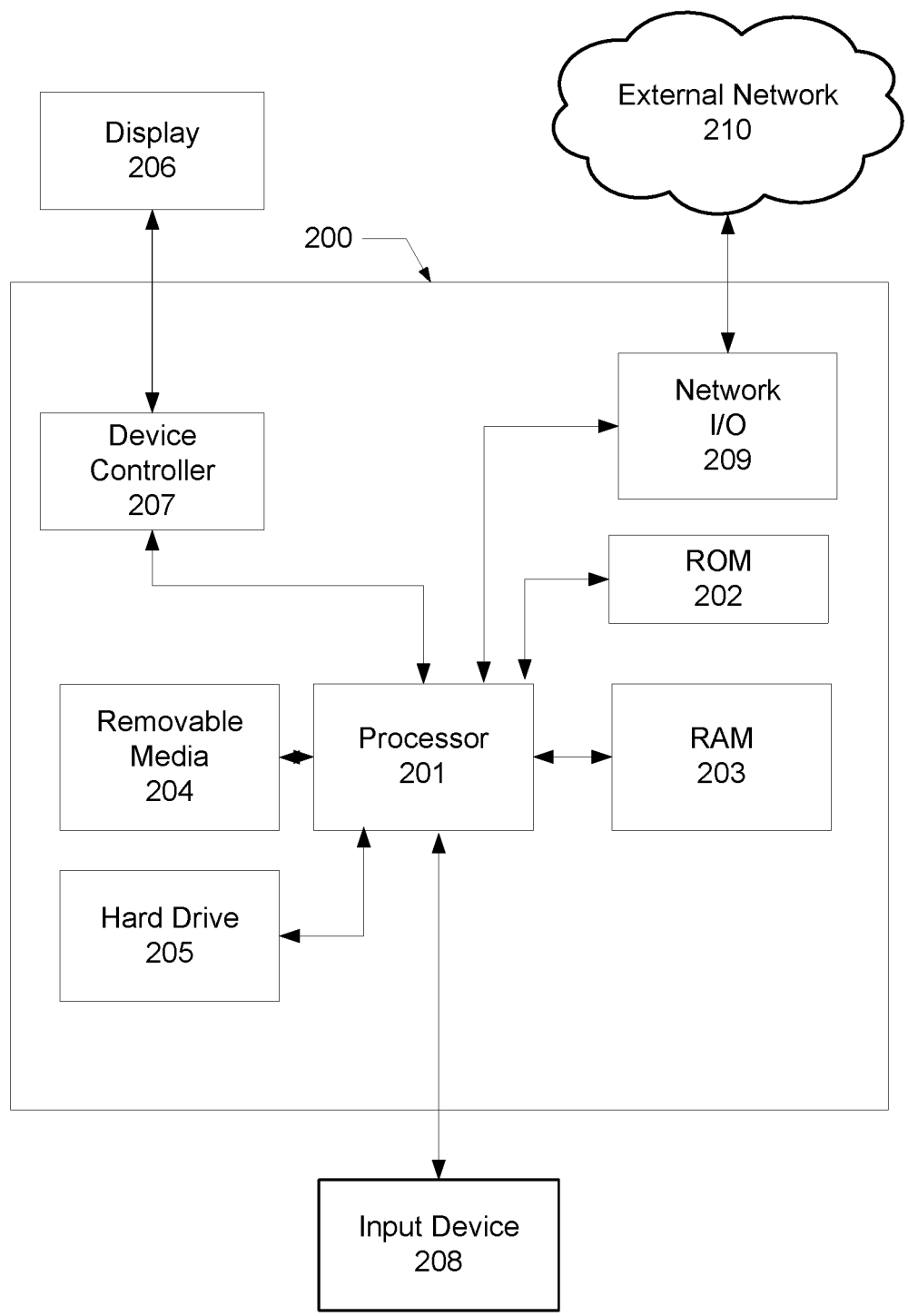
FIG. 2 shows general hardware elements of an example computing device.

FIG. 2 shows an example computing device that may be used to implement any of the methods described herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. The storage medium may comprise a plurality of sectors, wherein a size of each sector of the plurality of sectors is approximately a multiple of a substantially fixed fragment size. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, a wireless interface, or a combination of the two. The network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the illustrated components may be implemented as software. Modifications may be made to add, to remove, to combine, or to divide components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity may be a separate software process and program from a dependent entity, both of which may be executed as software on a common computing device.

One or more features of the disclosure may be implemented in computer-usable data or computer-executable instructions, such as in one or more program modules, executed by one or more computers or other devices. Program modules may include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like.

FIG. 3 shows an example HTTP Live Streaming (HLS) manifest file. The HLS manifest file may provide links indicating network locations where a content item, such as a Rockies baseball game, is stored. For example, a Rockies baseball game may be transmitted to a plurality of users (e.g., from a content provider, such as NBC). The baseball game may be stored (e.g., in a server, such as the content server 106 and/or the application server 107). Due to the data size of the baseball game, the entire baseball game might not be transmitted (e.g., by the server) at once. Rather, the baseball game may be split into more manageable chunks of data, such as a plurality of sequential content segments. Each content segment may be a ten-second audiovisual file of the baseball game. A file, such as manifest file 300, with links to the content segments of the baseball game may be created. If a user requests to watch the baseball game, such as when the user switches to a transmission of the baseball game, the manifest file 300 may be sent (e.g., from the server to a system on the client side). The system may include one or more user devices, such as the device 200, that may analyze and/or monitor the manifest file 300 as described below. Additionally or alternatively, any of the processes described below may be performed by any computing device or combination of computing devices.

Characteristics of the received manifest file 300 may be determined (e.g., by the system). The manifest file header 305 may include information indicating the media file target duration, the compatibility version of the manifest file, the media sequence of the manifest file, and/or the playlist type of the manifest file. The media file duration may be a playback duration or a length of the audiovisual file in the content segment. In the manifest file 300, the target duration "10" may indicate that the target playback duration of each content segment within the manifest file 300 is ten seconds.

The media sequence may refer to a sequence of manifest files for the baseball game. For example, the baseball game may be split into content segments, and the content segments may be grouped into separate manifest files. The media sequence of the manifest file 300 may be analyzed, and the relationship between the manifest file 300 and other manifest files for the baseball game may be determined. The media sequence of the manifest files may be an incrementing integer counter. Depending on the counter, the relationship between the manifest file 300 and other manifest files for the baseball game may be determined.

The playlist type of the manifest file may identify the type of the requested content. In the manifest file 300, the type of the requested content may be linear (e.g., a substantially live viewing of the baseball game). For linear types of content items, the manifest files may be continuously updated (e.g., by the server), and the updated manifest files may be continuously sent as the content item is occurring live.

Below the manifest file header 305 may be manifest file entries. Manifest file entries may indicate a content segment or an insertion opportunity. A manifest file entry may be detected based on an identifier, such as "#EXTINF: 9.97667." "EXTINF" may indicate that the following is a manifest file entry indicating a content segment, and "9.97667" may indicate a duration of a content segment corresponding to a link. Additionally, and/or alternatively, an insertion opportunity may be detected based on another identifier, such as an "EXT-X-SCTE35" identifier. The "EXT-X-SCTE35" may be a SCTE-35 standard that indicates insertion opportunities in content items.

Each manifest file entry indicating a content segment may include a link indicating a network location where the corresponding content segment is stored. The links (e.g., links 310, 315, 320, 325) in the manifest file 300 may be used to request the content segments as needed. Further, the links indicating content segments of the baseball game may be from the beginning of the baseball game to the end of the baseball game. The manifest file 300 may indicate a sequential order, from the beginning to the end of the baseball game, in which the content segments should be requested. Initially, the beginning or the first ten-second audiovisual file of the baseball game indicated by the link 310 may be requested (e.g., by the system). The link 310 may indicate a transport stream (e.g., "fileSequence0.ts.") or a uniform resource locator (URL) corresponding to the first ten-second audiovisual file. The first audiovisual file may be received. The baseball game may be displayed. Prior to the end of the first ten-second audio visual file, the second ten-second audiovisual file indicated by the link 315 may be requested and an uninterrupted display of the baseball game may be caused. Audiovisual files may be continuously requested and/or display of the baseball game may be continuously caused until the end of the baseball game.

Figure 9:
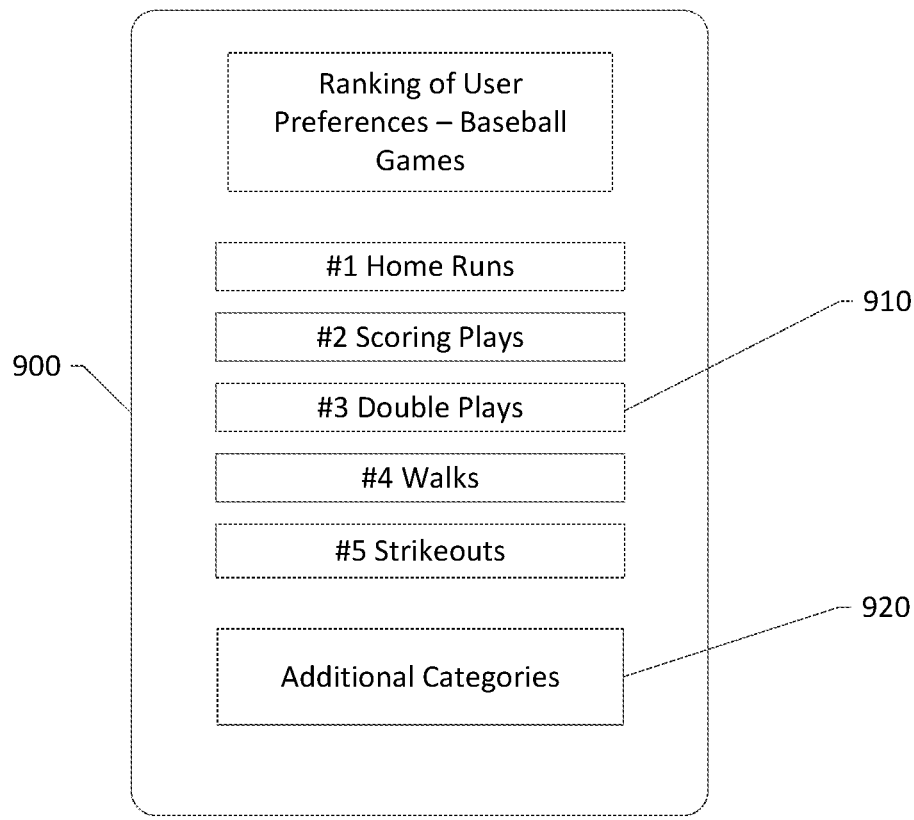

The manifest file 300, in addition to providing links indicating network locations of the content segments, may also include tags (e.g., "#EXTINF:9.97667, Home Run, 7.038") indicating events within content segments of the baseball game. For one or more entries of the manifest file 300, a tag may be provided indicating that the content segment may correspond to an event in the content segment. Thus, manifest file entry 370 may include a link (e.g., "fileSequence10.ts"), a corresponding home run tag (e.g., "Home Run"), and a time offset (e.g., "7.038") indicating how far into the content segment the home run occurs. Additionally, the manifest file entry 345 may include the link, a scoring play tag, and a time offset indicating how far into the specific segment the scoring play occurs. These tags indicating events may be any user preferred event. For example, referring to FIG. 9, the tags may indicate home run events, scoring play events, double play events, walk events, and/or strikeout events. In other genres of content, such as action movies, the tags may indicate gunfights, car chases, fight scenes, and/or other events of interest available for the user to subscribe to.

Manifest file entries may indicate an insertion opportunity, such as gaps between the content segments where advertisements may be placed. The tags for the manifest file entry may indicate an event within the baseball game, as described above, or an insertion opportunity (e.g., a "EXT-X-SCTE35" identifier). For example, advertisements may be provided during the commercial breaks of the baseball game. A manifest file entry, such as the manifest file entry 330, may indicate an insertion opportunity—a location to where advertisements may be inserted within a content item. Based on detecting the insertion opportunity, advertisements may be requested (e.g., from the server). Additionally, the manifest file entry 330 may indicate metadata for the insertion opportunity, such as the duration of the insertion opportunity, duration of one or more advertisements within the insertion opportunity, and/or the type of advertisements to be displayed for the insertion opportunity.

At the bottom of the manifest file 300 may be manifest file entry 375, such as "#EXT-X-ENDLIST", which may indicate the end of the content item. Based on identifying the manifest file entry 375, there may be a determination that the baseball game has ended and that no new content segments may be available for playback.

Additionally, and/or alternatively, manifest files might not initially include the manifest file entry 375 indicating the end of the content item. For example, a content item, such as a baseball game, may be linearly transmitted to a plurality of users. Since the end time of the baseball game may vary, the manifest file might not include a manifest file entry indicating the end of the content item. Instead, updates to the manifest file, such as new manifest file entries indicating new content segments available for playback, may be continuously received. A manifest file entry indicating the end of the content item may be received (e.g., when the baseball game has ended).

A manifest file entry indicating the end of the content item might never be received. For example, updates to the manifest file for a baseball game may be continuously received. If the baseball game ends, rather than receiving a manifest file entry indicating the end of the baseball game, new manifest file entries for a new content item, such as the content item being transmitted immediately following the baseball game, may be received.

FIG. 4 shows simplified examples of manifest files. For example, a system on the client side (and/or other computing devices) may be able to request manifest files for three different content items: a Rockies baseball game, a Cardinals baseball game, and a Nationals baseball game. Of these three content items, the system may download and cause display of audiovisual segments for one of the content items, such as for only the Rockies baseball game. FIG. 4 may show simplified manifest files for the three different baseball games. The Rockies baseball game manifest file (Rockies manifest file) 300 may be a simplified version of the manifest file 300. The manifest file entries for the Rockies manifest file 300, shown in FIG. 4, may show simplified versions of the manifest file entries 310 through 370. Additionally, and/or alternatively, the manifest file entry 375 may indicate the end of the content item, such as the Rockies baseball game. Since the Rockies baseball game may be occurring live, the manifest file 300 shown in FIG. 4 might not include the manifest file entry 375.

The manifest file entries 310 through 370 may include links indicating network locations storing content segments for the Rockies baseball game and may further include events, such home runs, scoring plays, and/or insertion opportunities. The Cardinals baseball game manifest file (Cardinals manifest file) 405 and the Nationals baseball game manifest file (Nationals manifest file) 406 may also show simplified versions of additional manifest files that may correspond to a Cardinals baseball game and a Nationals baseball game. The Cardinals manifest file 405 header and the Nationals manifest file 406 header may include similar and/or different characteristics to the manifest file header 305 described above.

The Rockies, Cardinals, and Nationals baseball games may be occurring live, and new content segments may be received (e.g., by a server) and the manifest file may be updated accordingly. For example, as the baseball games are occurring in real-time, content segments for the baseball games may be continuously received and stored. As new content segments are being stored, the manifest files may also be continuously populated and updated as the new content segments become available. For example, a new content segment for the Rockies baseball game may be stored, and the manifest file 300 may be updated. The updated manifest file, such as the manifest file 300, may be transmitted (e.g., to the system on the client side upon request).

Figure 5:
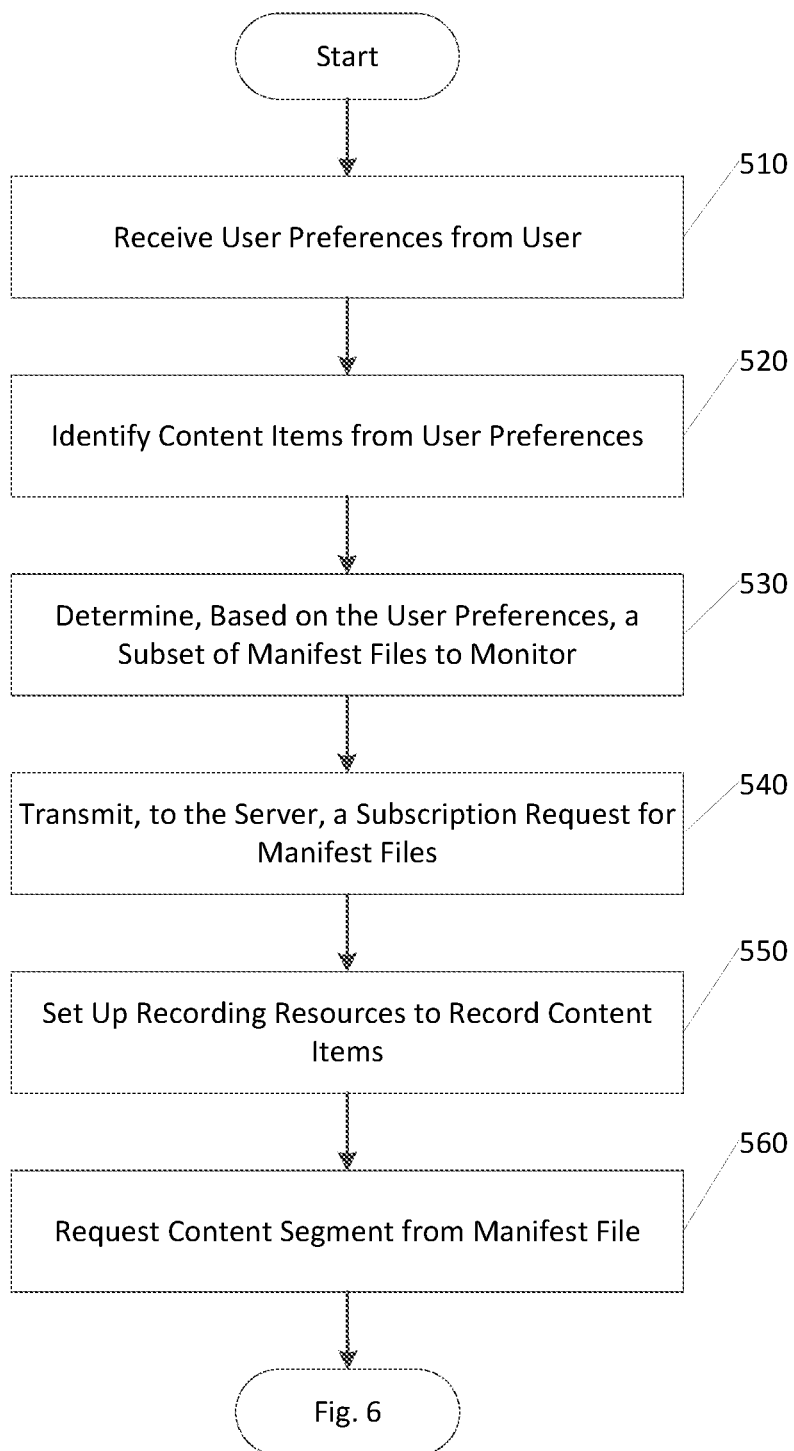
FIG. 5 shows an example method for configuring user preferences.

FIG. 5 shows an example method for configuring user preferences. The example method may be performed by one or more computing devices and/or other systems, which device(s) and/or system(s) may act as a client, as a server, and/or as another element of a network. While the steps of the example method may be described in a particular order, the order of the steps may be altered without departing from the scope of the disclosure provided herein.

In step 510, preferences from a user may be received. A user may list, prioritize, or rank content items that the user prefers to watch. For example, the user may prioritize, in order, watching the Rockies baseball game, the Cardinals baseball game, and the Nationals baseball game. The user may use a graphical user interface, such as the graphical user interface shown on FIG. 8, to input his/her preferences. As shown on FIG. 8, a user may prioritize a list 810 of channels and/or other sources of content, e.g., providers of video-on-demand (VOD) and/or of any other type or form of content. For example, the Rockies baseball game may be shown via NBC, the Cardinals baseball game may be shown via FOX, and the Nationals baseball game may be shown via ESPN. The user may input, in order of preference, NBC, FOX, and ESPN.

A user may use the additional categories feature 820 to input priorities or preferences for events, such as home runs, occurring in the baseball games. For example, if a user selects the additional categories feature 820, graphical user interface 900 may be displayed, as shown on FIG. 9. As shown on FIG. 9, a user may rank or prioritize events 910 the user prefers to watch for the additional category, such as for baseball games. For example, a user may prefer to watch, in order of preference, home runs, scoring plays, double plays, walks, and strikeouts.

The additional categories feature 820 or 920 might not be for baseball games, but rather for another sport (e.g., football, baseball, hockey) or another genre of content (e.g., comedy genre, action genre, drama genre). The user may input different user preferences for the additional categories. For example, for an action genre, a user may prioritize gunfights, car chases, fight scenes, etc.

A user may input user preferences and view content on one user device. Additionally, and/or alternatively, a user may view content on a first user device (e.g., laptop computer, tablet, smart phone, or television set) and the graphical user interface 800 or 900 may be displayed on a second device (e.g., another laptop computer, tablet, smart phone, or television set). As a user is viewing content on the first device (e.g., a tablet), the user may log in on a second device (e.g., a smart phone). The user may input preferences, via an application on the smart phone, as the first device is receiving and causing display of the baseball game.

Additionally, and/or alternatively, rather than the user preferences indicating content items, such as baseball games, the user preferences may include applications, such as HULU or NETFLIX. For example, the user may input user preferences such as NBC, FOX, and NETFLIX. The user may prefer to watch in order NBC, then FOX. However, if both NBC and FOX are showing advertisements, the user may then prefer to watch a movie via the NETFLIX application instead.

Additionally, and/or alternatively, user preferences may be received from a plurality of different users. Each user may input his/her own user preferences. The user preferences from the plurality of different users may be aggregated. The most popular content item from the aggregated user preferences may be the top priority content item, the second most popular content item may be the second priority content item, and so on.

Additionally, and/or alternatively, the user preferences may be retrieved from a linked social media account. The user may log into a social media account on a user device. The social media account may indicate content that the user enjoys watching (e.g., a "like" on a show's web page). User preferred shows or content items may be retrieved from the social media account by, e.g., one or more computing devices performing operations of the method of FIG. 5 or of other methods disclosed herein. Based on this retrieved information, the user preferences may be prioritized similar to the displayed graphical user interfaces 800 or 900. Further, these preferences may be recommendations and the user may continue to use the graphical user interface 800 or 900 to select, move, and/or replace the recommended user preferences.

Additionally, and/or alternatively, the user preferences may be retrieved based on ratings of a plurality of content items. The user may input a user preference indicating that he/she would like to watch a movie from the action genre. Ratings of the action movies may be retrieved, and based on the ratings, user preferences may be generated. For example, an action movie rated four out of five would be a higher priority content item than an action movie rated three out of five.

In step 520, content items may be identified from the user preferences. For example, referring to FIG. 8, the user may input preferences for content providers, such as NBC, FOX, and ESPN. A content provider may comprise any type of entity or source from which content may be obtained. Content items corresponding to the preferred content providers that are currently being transmitted, such as the Rockies baseball game, the Cardinals baseball game, and the Nationals baseball game, may be identified. Additionally or alternatively, referring to FIG. 9, the user preferences may indicate user preferred baseball events. Content items corresponding to the preferred baseball games that are currently being transmitted, such as the Rockies baseball game, the Cardinals baseball game, and the Nationals baseball game, may be identified.

In step 530, there may be a determination of a subset of manifest files to monitor. For example, at any given time, a user may have the option to watch many different content items, and each content item may correspond to a different manifest file. However, the user preference may indicate a few content items, such as the Rockies baseball game, the Cardinals baseball game, and the Nationals baseball game, that the user prefers to watch. A subset of manifest files, such as the Rockies manifest file 300, the Cardinals manifest file 405, and the Nationals manifest file 406, may be requested.

In step 540, a subscription request, for the subset of manifest files corresponding to the content assets determined in step 520, may be transmitted to a server (e.g., the push server 105, the content server 106, and/or the application server 107). By subscribing to the manifest files, updated and/or new manifest files for the corresponding content item may be periodically received. For example, as mentioned earlier, a content item, such as the Rockies baseball game, may be occurring live, and the Rockies manifest file 300 may be populated and/or updated (e.g., by the server) as the Rockies baseball game is occurring. By subscribing to the Rockies manifest file 300, updated and/or new manifest file entries for the Rockies game may be periodically received. Referring to FIG. 4, initially, the Rockies manifest file 300 may include one manifest file entry, such as the manifest file entry 310. As the Rockies baseball game progresses, new manifest file entries (e.g., the entries 315 through 370) may be periodically received.

Additionally, and/or alternatively, rather than transmitting a subscription request for the subset of manifest files, a request for updates to the manifest file may be periodically sent to the server. For example, at a fixed time interval (e.g., every ten seconds) a request may be sent to the server, requesting updates to the subset of the manifest files. The request may be received (e.g., by the server) and the updates may be returned. The updates may include one or more manifest file entries indicating new content segments available for download.

To facilitate a continuous playback of the baseball game for the user, updated manifest files may be received and/or requested prior to causing display of a current audiovisual content segment. For example, network conditions may cause a delay between requesting a content segment and receiving the content segment. To facilitate a continuous playback, content segments may be requested in advance of needing to cause display of the content segment. Likewise, updated manifest files may be requested and received in advance based on the delay caused by the network conditions. By requesting updated manifest files and/or content segments in advance, a continuous stream of content may be delivered to the user.

The request for updated manifest files may be transmitted, and the subset of manifest files, including the Rockies manifest file 300, the Cardinals manifest file 405, and the Nationals manifest file 406, may be received. Although three manifest files shown in FIG. 4, there may be an analysis of as many manifest files as indicated by the user preferences, including, but not limited to, an entire genre of manifest files corresponding to a genre of content items. For example, on a Sunday afternoon, ten different baseball games may be occurring live. The user preferences may indicate six of the ten baseball games, and the six manifest files corresponding to the six baseball games may be analyzed.

In step 550, recording resources may be set up to record content items. For example, the user preferences may indicate the Rockies baseball game, the Cardinals baseball game, and the Nationals baseball game. The recording resources for the three baseball games may be set up. However, there might not be available recording resources for recording the content items. For example, a system may only be able to record one content item. In such a case, content segments for the highest ranked content item, the Rockies baseball game, may be requested and received. Then, for example, the second highest ranked content item, the Cardinals baseball game, may be recorded. Due to the recording resources, the third highest content item, the Nationals baseball game, might not be recorded.

Additionally, and/or alternatively, the user preferences may indicate events occurring in a genre or category of content (e.g., baseball). Thus, there may be an attempt to set up recording resources to record all of the content items. But, again, the recording capabilities may continue to be limited. As such, user commands to record certain content items may be received and/or the most popular content items may be recorded.

In step 560, a content segment from a manifest file may be requested. For example, the user may configure his/her user preferences, and may seek to begin watching his/her top ranked content item, the Rockies baseball game. In step 560, a content segment from the Rockies manifest file 300 may be requested. The content segment may be received, and display of the requested content segment may be caused. The Rockies baseball game may be just beginning, and the first content segment for the Rockies baseball game (e.g., the content segment corresponding to the first manifest file entry 310) may be requested. Additionally, and/or alternatively, the Rockies baseball game may be transmitted live and may have already started. The most recent content segment for the Rockies baseball game, which might not be the first content segment of the baseball game, may be requested.

Figure 6:
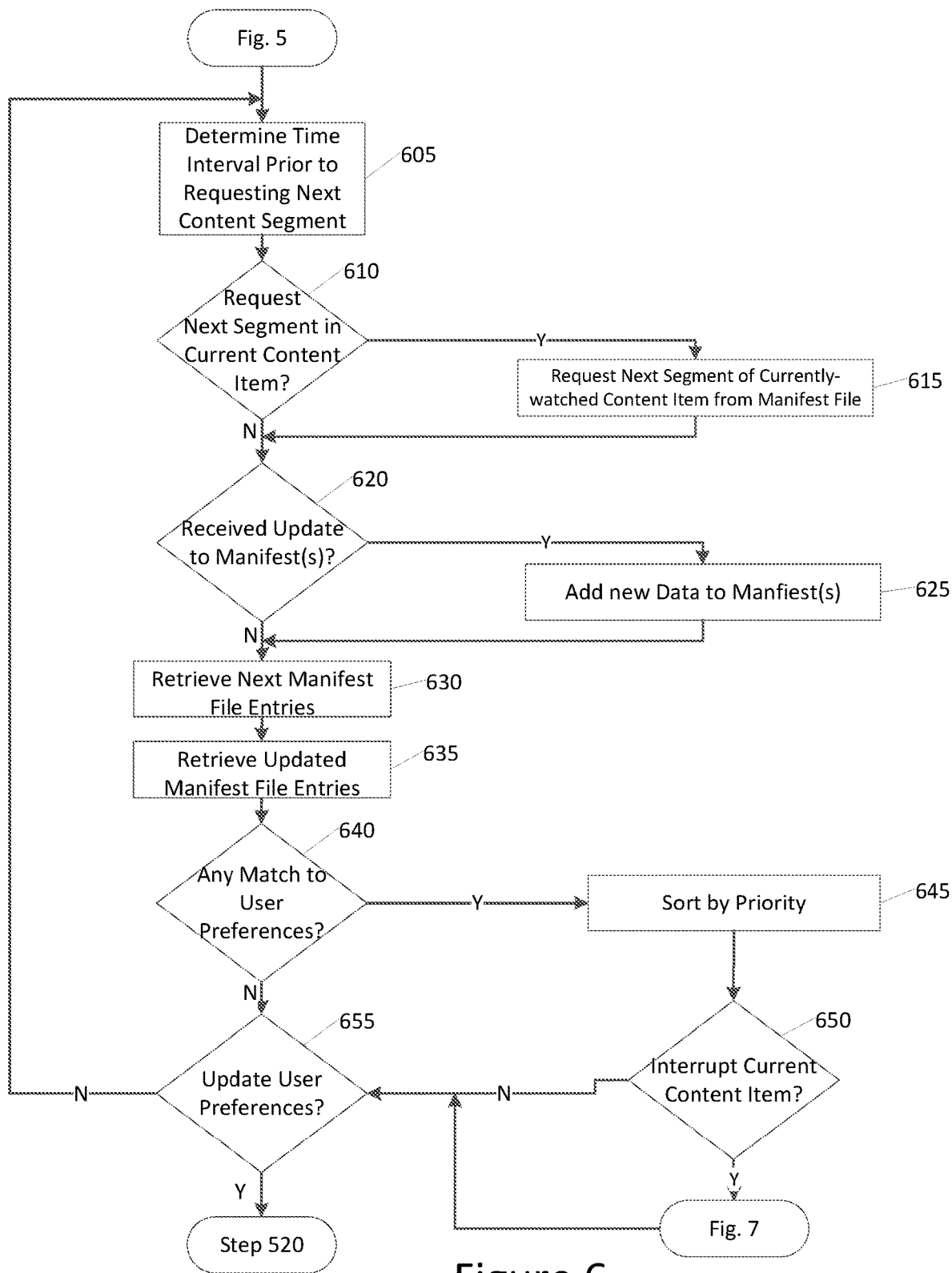
FIG. 6 shows an example method for identifying events and insertion opportunities within content items.

FIG. 6 shows an example method for identifying events and insertion opportunities within content items. The example method may be performed by one or more computing devices and/or other systems, which device(s) and/or system(s) may act as a client, as a server, and/or as another element of a network. The example method of FIG. 6 may be performed in whole or in part by the same device(s) and/or system(s) performing some or all operations associated with the example method of FIG. 5. While the steps of the example method may be described in a particular order, the order of the steps may be altered without departing from the scope of the disclosure provided herein.

In step 605, a time interval prior to requesting the next content segment of content for the Rockies baseball game may be determined. The time interval may be used to facilitate a continuous playback for the content item. For example, in FIG. 5, the Rockies manifest file 300, the Cardinals manifest file 405, and the Nationals manifest file 406 may have been received. The playback duration of the Rockies manifest file header 305 may be analyzed to determine that each content segment is ten seconds in duration. However, network conditions may cause a delay between requesting the content segment and receiving the content segment. For example, if the network conditions are normal, the time span between requesting the content segment, processing the request, and receiving the next content segment may be five seconds. In that example, and to provide continuous playback for the user, the determined time interval between start of playback of a current segment and requesting the next segment of content may be five seconds (e.g., ten second playback duration of a current segment minus five seconds between requesting and receiving the next content segment). If network conditions are suboptimal, such as high latency or low bandwidth, the time span may be high (e.g., eight seconds), the determined time interval between start of playback of a current segment and requesting the next segment of content may be two seconds (e.g., ten second playback duration of a current segment minus eight seconds for requesting and receiving the next content segment).

Additionally, and/or alternatively, if the network conditions are suboptimal, segments of content may be requested at a normal or fixed time interval (e.g., every five seconds), but a different quality content segment may be requested. For example, during normal network conditions, a high definition version or 4K version of the content segment may be requested. But, if network conditions are suboptimal, a standard definition version of the content segment may be requested.

In step 610, there may be a determination of whether to request the next segment of the current content item. There may be a wait until the time interval in step 605 has elapsed prior to requesting the next content segment of the content item. For example, display of a content segment for the Rockies baseball game may be being caused. There may be a determination of whether the time interval in step 605 has elapsed. If the time interval has elapsed, the method may move to step 615.

In step 615, a next content segment of the currently-watched content item from the manifest file may be requested. The next content segment may be the next sequential content segment for the content item. For example, display of a content segment for the Rockies baseball game corresponding to the manifest file entry 310 may be caused. There may be a determination that the next sequential content segment for the Rockies baseball game may be the content segment indicated by the manifest file entry 315. In step 615, the link in the manifest file entry 315 (e.g., "fileSequence1.ts") may be used to request the next content segment from the server. The next content segment may be received, and display thereof may be caused.

The next content segment may be requested in step 615, and the method may proceed to step 620. Additionally, and/or alternatively, in step 610, there may be a determination not to request the next content segment of the Rockies baseball game (e.g., the time interval has not elapsed), and the method may proceed to step 620 from step 610.

In step 620, there may be a determination of whether any updates to the manifest files have been received. For example, the Rockies baseball game, the Cardinals baseball game, and/or the Nationals baseball game may be occurring live. The manifest files for the baseball games, such as the Rockies manifest file 300, may be being updated (e.g., by the server) with new manifest file entries indicating new content segments for the Rockies baseball game. The updated Rockies manifest file 300, with the new manifest file entries, may be sent (e.g., from a server to one or more computing devices on the client side). There may be a determination of whether any updates have been received, and if so, the method may proceed to step 625.

Additionally, and/or alternatively, the new updates to the manifest files may be a new tag or event description for an already received manifest file entry. As mentioned previously, manifest file entries may include a link to a content segment and a tag indicating an event has occurred during the content segment. For example, the manifest file entry 370 may include a link to a content segment and may also include a tag indicating an event, such as a home run, has occurred during the content segment. Further, the manifest file entry 416 may include a link to a content segment and may also include a tag indicating a strikeout has occurred during the content segment. However, the link to the content segment and the tag indicating an event for the content segment may be received at different times. For example, as a home run is occurring during a live transmission of the Rockies baseball game, an administrator assigned to input tags indicating the home run may first need to view the home run, and then input a descriptor, "home run," for the content segment. The Rockies manifest file with the manifest file entry 370 indicating a link to the corresponding content segment may be first received. At a later time, updates to the manifest file entry 370 may be received. The update may include the manifest file tag "home run."

In step 625, the new data, such the new manifest file tags, and/or the new manifest file entries, may be added to the pre-existing manifest file, such as the Rockies manifest file 300.

In step 630, the next manifest file entries in the manifest file may be retrieved. The next manifest file entries may indicate content segments that are next in the linear transmission of the content item. For example, there may be a determination of, from a start time of the content item, such as the Rockies baseball game, a current playback position of the content item (e.g., how long the Rockies baseball game has been live). Each manifest file entry in the Rockies manifest file 300 may indicate a playback duration in relation to the entire transmission of the Rockies baseball game. For example, the current playback position for the Rockies baseball game may be twenty-five seconds. If each content segment in the Rockies manifest file 300 is ten seconds in duration, the content segment indicated by the manifest file entry 320 may be determined as the current content segment. The next manifest file entry in the Rockies manifest file, the manifest file entry 325, may then be retrieved. There may also be a retrieval of the next manifest file entries from the other manifest files, such as the manifest file entry 425 from the Cardinals manifest file 405 and the manifest file entry 426 from the Nationals baseball game.

In step 635, updated manifest file entries received in step 625 may be retrieved. As mentioned above in step 625, the manifest file entry and the tag indicating an event for the manifest file entry may be received at different times. For example, the user preferences may indicate that the user prefers to watch double plays in baseball games. However, referring to step 620, the manifest file tag indicating the double play may be received (e.g., after the live transmission of the Nationals baseball game). Based on a determination that the tag has been received and added to the manifest file entries, the updated manifest file entry indicating the double play, such as the manifest file entry 416, may be retrieved.

In step 640, there may be a determination of whether the retrieved manifest file entries match any user preferences. There may be a determination of matches between the entries retrieved in steps 630 and 635 and the user preferences. The user preferences may indicate the user wants to watch certain content providers and/or certain events. Matches between these user preferences and the upcoming transmission of the show (e.g., content segment for the next manifest file entries) or in an already transmitted content segment of the show (e.g., content segments for the updated manifest file entries) may be identified.

The retrieved manifest file entries, including the manifest file tags for the entries, may be analyzed. In step 630, the next manifest file entries 325, 425, and 426 may be retrieved. In step 635, an updated manifest file entry 416 may be retrieved. Thus, two different entries may be retrieved from the Nationals manifest file 406, one from the live show and another that had been previously transmitted. The manifest file tags for these entries may be analyzed. As mentioned previously, the tags may indicate events, such as a home runs or strikeouts, or insertion opportunities, such as commercial breaks, within a content item. The tags may include a time offset indicating how far into the content segment the event occurs. As shown on FIG. 4, the manifest file entry 325 may include a tag indicating a walk, the manifest file entry 425 may include a tag indicating an insertion opportunity, the manifest file entry 426 may include a tag indicating a home run, and the manifest file entry 416 may indicate a tag indicating a double play.

The manifest file entries may be analyzed to identify the manifest file tags, and these tags may be matched to the user preferences. For example, the user preferences, as shown in the graphical user interface 900, may indicate home runs, scoring plays, double plays, walks, and strikeouts. These user preferences may be compared and matched with the retrieved manifest file tags. For example, the manifest file entry 426 may match the first or top user preference, home run, and the manifest file entry 416 may match the third user preference, double play. Since two of the manifest file entries match the user preferences, the method may proceed to step 645.

Figure 8:
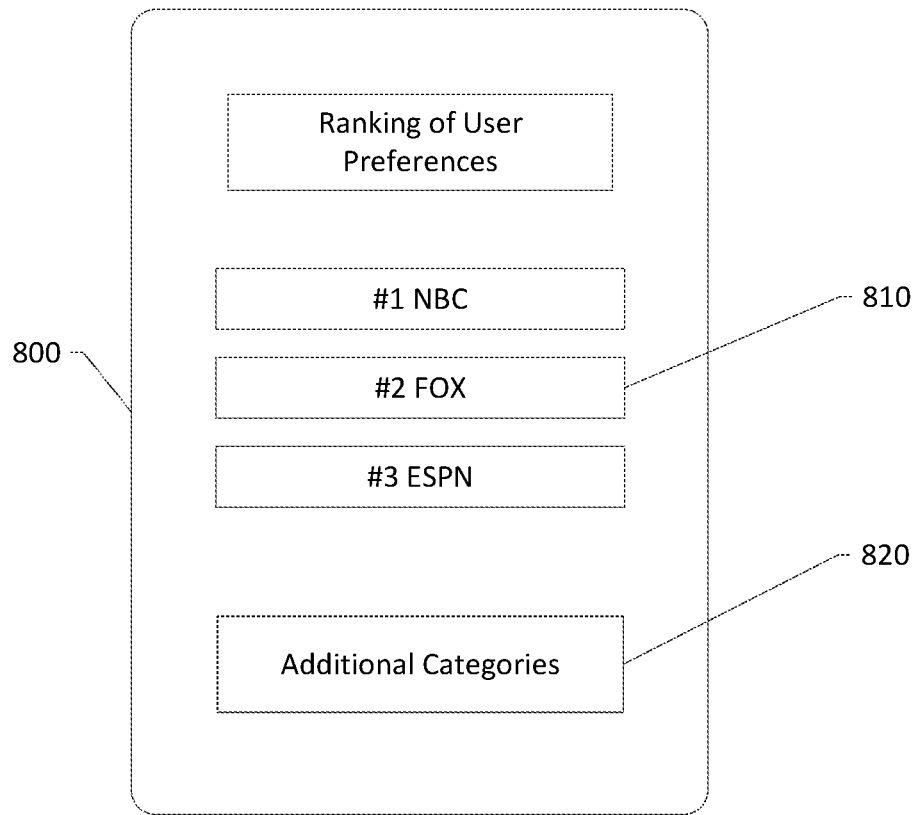
FIGS. 8 and 9 show graphical user interfaces for configuring user preferences.

Additionally, and/or alternatively, referring to FIG. 8, the user preferences may indicate content providers, such as NBC, FOX, and ESPN. If the user indicates content providers rather than events, there may be a determination of whether the content item is at a commercial break. For example, the user might not desire to watch advertisements, and if NBC reaches an insertion opportunity (e.g., a commercial break), a second content provider, FOX, may be switched to. In step 640, there may be a determination of whether any of the content providers identified in the user preference indicates a commercial break (e.g., any retrieved manifest file entry indicates an insertion opportunity). Because the manifest file entry 426 includes a tag indicating an insertion opportunity, the method may move to step 645.

Additionally, and/or alternatively, the user preferences may indicate both content providers and events. There may be a determination of whether any retrieved manifest file entries indicate user preferred events or insertion opportunities. If so, the method may move to step 645.

In step 645, the retrieved manifest file entries may be sorted by priority. There may be a sorting or ranking of the retrieved manifest file entries in step 630 using the user preferences. For example, the retrieved manifest file entries may include the manifest file entry 325 indicating a walk, the manifest file entry 425 indicating an insertion opportunity, the manifest file entry 426 indicating a home run, and the manifest file entry 416 indicating a double play. Referring to the user preferences shown in FIG. 9, the manifest file entry 426 indicating a home run may be the first ranked manifest file entry. The manifest file entry 416 indicating a double play may be the second ranked manifest file entry. Since the manifest file entry 325 indicating a walk and the manifest file entry 425 indicating an insertion opportunity are not shown by the user preferences, these manifest file entries may be sorted or ranked at lower rankings than the manifest file entry 426 and the manifest file entry 416.

Additionally, and/or alternatively, referring to the user preferences shown in FIG. 8, the user preferences may indicate content providers, such as NBC, FOX, and ESPN. NBC may be showing the Rockies baseball game, FOX may be showing the Cardinals baseball game, and ESPN may be showing the Nationals baseball game. The manifest file entries may be retrieved, and the manifest file entries may be sorted or ranked by the content providers. Initially, the manifest file entry 325 may be first, the manifest file entry 425 may be second, and the manifest file 426 may be third. However, the user may seek to avoid watching advertisements. Thus, manifest file entries indicating insertion opportunities, such as the manifest file entry 425, may be identified, and these entries may be ranked after manifest file entries indicating content. Therefore, the manifest file entry 325 may be ranked first, then the manifest file 426 may be second, and the manifest file entry 425 may be third. Since no user preferred events have been identified, the updated manifest file entries, such as the manifest file entry 416, might not be sorted or ranked. Additionally, and/or alternatively, these updated manifest file entries, such as the manifest file entry 416, may be sorted or ranked after the live manifest file entries indicating content, but before manifest file entries indicating insertion opportunities.

Additionally, and/or alternatively, the user preferences may indicate content providers and events. For example, a user may seek to watch his/her favorite baseball team, such as the Rockies. Then, during commercial breaks, the user may seek to watch events, such as home runs and scoring plays, in other live baseball games. As such, the manifest file entries in the Rockies manifest file 300 may be sorted or ranked first. If a manifest file entry indicating an insertion opportunity in the Rockies manifest file 300 (e.g., the beginning of an opportunity to insert advertisements) is identified, that entry may be ranked after the user preferred event manifest file entries, such as manifest file entries in the Cardinals manifest file 405 or the Nationals manifest file 406 indicating user preferred events (e.g., home runs or scoring plays). If a manifest file entry in the Rockies manifest file 300 indicates a content segment (e.g., the end of the opportunity to insert advertisements), the manifest file entry from the Rockies manifest file 300 may be again ranked first. Thus, display of the Rockies baseball game may be caused if the baseball game is showing content, but may show other user preferred events, such as home runs and scoring plays, during the commercial breaks.

In step 650, there may be a determination, based on the sorted list of manifest file entries from step 645, of whether to interrupt the current content item. For example, display of a content item, such as the Rockies baseball game, may be caused. There may be a ranking of the priorities in step 645. There may be a determination of whether to continue causing display of the Rockies baseball game or to begin causing display of another content item, such as the Cardinals or Nationals baseball games. As mentioned previously, the next manifest file entries in step 630 may indicate the next segment of content for the live transmissions of the content items. There may be a determination of whether the top manifest file entry, from the sorting or ranking of manifest file entries in step 645, is a manifest file entry from the Rockies baseball manifest file 300. If so, the method may move to step 655. For example, if the top ranking manifest file entry is the manifest file entry 325, there may be a determination not to interrupt the user from watching the Rockies baseball game and the method may move to step 655. However, if the top ranking manifest file entry is not a manifest file entry from the Rockies baseball game (e.g., the manifest file entry 426 indicating a home run), there may be a determination to interrupt the user from watching the Rockies baseball game and the method may move to FIG. 7.

Figure 7:
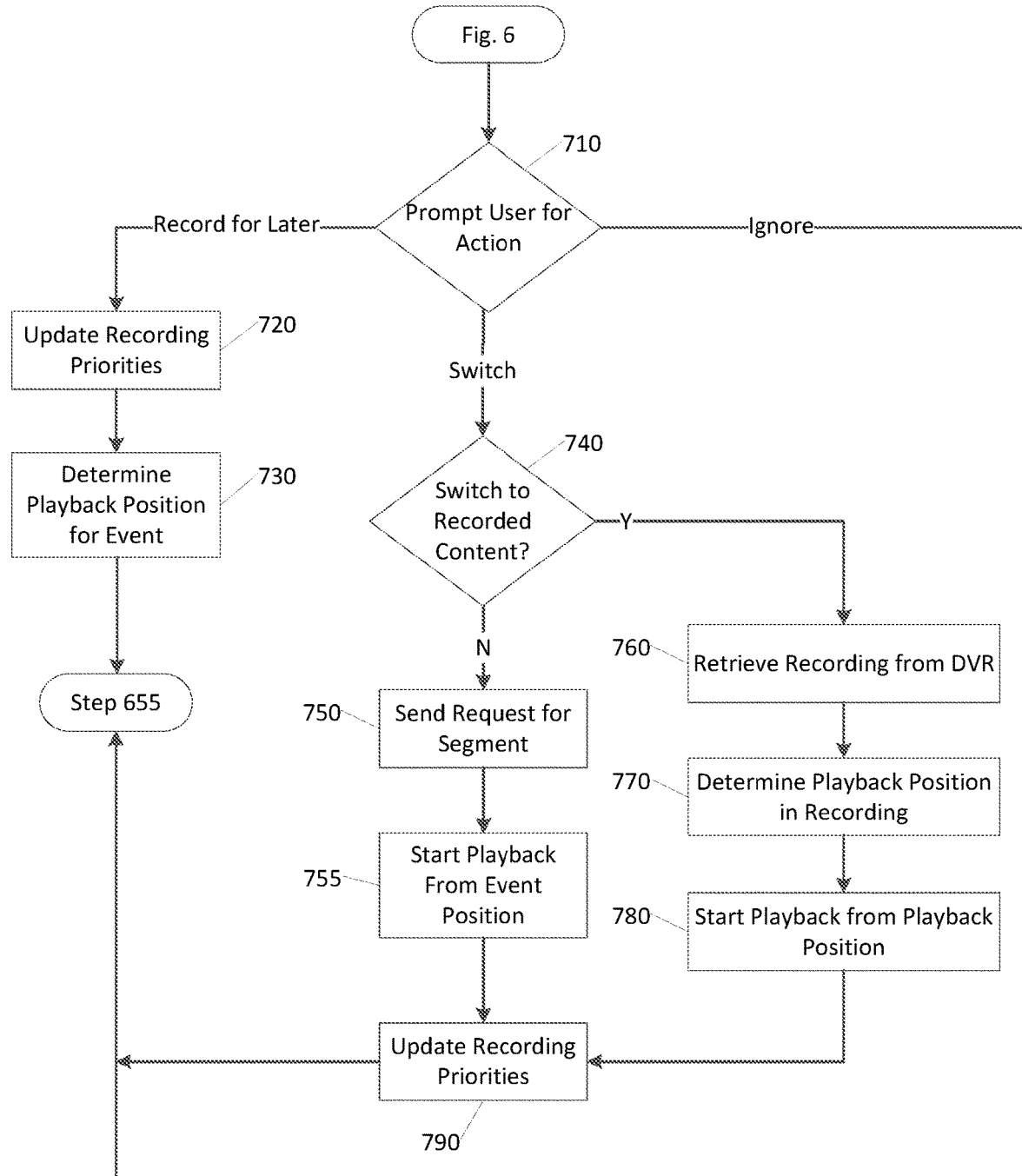
FIG. 7 shows an example method for transitioning between content items based on user inputs.

FIG. 7 shows an example method for transitioning between content items based on user inputs. The example method may be performed by one or more computing devices and/or other systems, which device(s) and/or system(s) may act as a client, as a server, and/or as another element of a network. The example method of FIG. 7 may be performed in whole or in part by the same device(s) and/or system(s) performing some or all operations associated with the example method of FIG. 5 and/or some or all operations associated with the example method of FIG. 6. While the steps of the example method may be described in a particular order, the order of the steps may be altered without departing from the scope of the disclosure provided herein.

Figure 10:
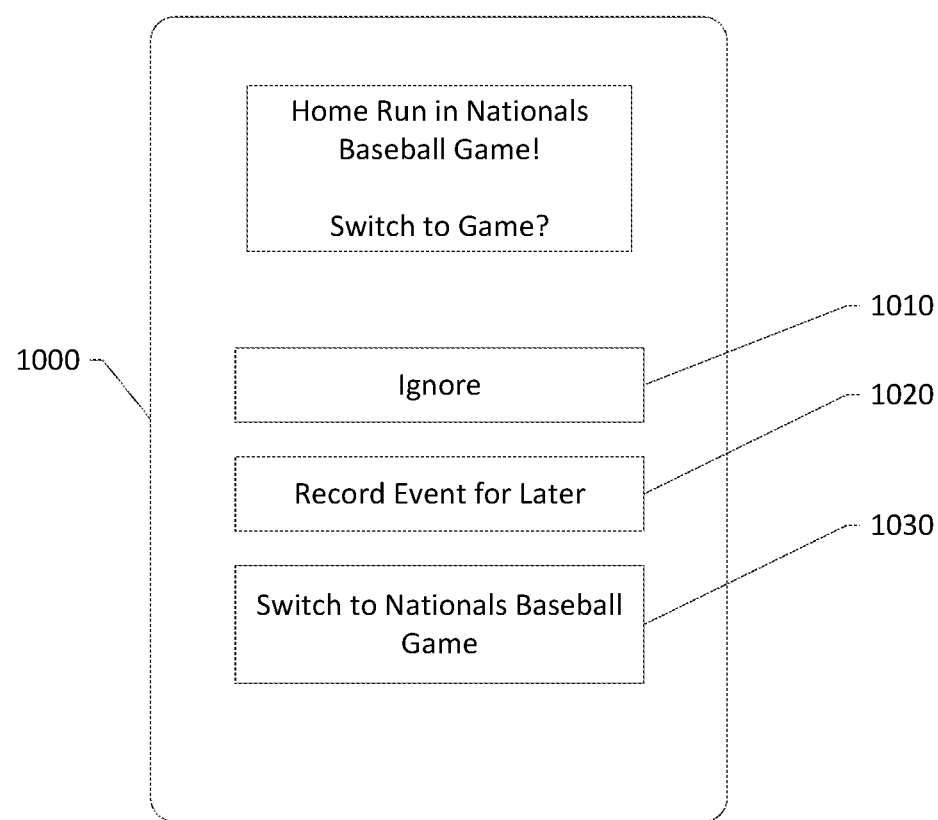
FIG. 10 shows a graphical user interface for switching to another content item.

In step 710, based on the determination to interrupt the user from watching the currently displayed content item (e.g., the Rockies baseball game), the user may be prompted for an action. For example, the user preferences may indicate that the user wants to watch home runs. Furthermore, in step 650, there may be a determination that the top ranking manifest file entry is not from the Rockies baseball game, but rather from the Nationals baseball game indicating a home run (e.g., the manifest file entry 426). A graphical user interface, such as the graphical user interface shown in FIG. 10, may be used to prompt a user action. As shown on FIG. 10, the graphical user interface may indicate that a home run has occurred in the Nationals baseball game and may prompt the user for an action. The user may select the action using the graphical user interface. For example, the user may ignore 1010 the event, record the event for later 1020, or switch to the Nationals baseball game 1030. Additionally, and/or alternatively, the user preferences may indicate a default action to be taken upon the occurrence of any event. For example, the user may select via the user preferences to always switch to the event in order to avoid the prompt for the user input.

If the user selects to ignore 1010 the event, the method may move to step 655. If the user chooses to record the home run for later, the method may move to step 720. In step 720, the recording priorities may be updated. For example, while the Rockies baseball game might not be showing a home run, the game may still be interesting for the user. The user may decide that he/she would like to continue watching the Rockies baseball game, but may want to watch the home run at a later time, such as during a commercial break of the Rockies baseball game. The event, such as the home run, may be recorded. However, as mentioned previously, recording capabilities may be limited. Thus, due to the user indicating that he/she would like to watch the home run at a later time, the recording priorities may be updated to record the home run. Further, since the home run is being recorded, recording of a different content item may be stopped. The manifest file entries may be continuously used to record user preference events in other content items. A highlight reel of events in the different content items may be created. And, at another time, the user may watch the highlight reel of the events within the different content items.

In step 730, a playback position for the event may be determined. For example, many events and/or different content items may be recorded. A time or playback position in the recording that indicates the event, such as the home run, may be determined. Each manifest file entry, such as the manifest file entry 426, may correspond to a playback duration in the content item (e.g., 40-50 seconds into the Nationals Baseball Game). Furthermore, a manifest file entry may also include a time offset (e.g., 5.5 seconds) indicating when the event occurred within the content segment. By using the playback position corresponding to the manifest file entry and the time offset, a playback position (e.g., 45.5 seconds within the Nationals Baseball Game) for occurrence of the home run may be determined. If the user decides to watch the home run at a later time, the time or playback position in the recording may be shown to the user. The playback position may be determined, and the method may move to step 655.

If, in step 710, the user selects the option to switch to the Nationals baseball game, the method may move to 740. In step 740, there may be a determination of whether to switch to recorded content. For example, referring back to step 550, recording resources may be set up to record the content items. In step 740, the user may determine whether the content segment indicating the home run has been recorded. As mentioned above, manifest file entry 426 indicating the home run may be from a live transmission of the Nationals baseball game. The home run might not have been recorded yet, and the method may move to step 750.

In step 750, a request for the content segment indicating the home run may be sent (e.g., to the server). For example, the manifest file entry 426 may include a link indicating a home run in the Nationals baseball game. The user may select the option to switch to the Nationals baseball game due to the indicated home run, and a request for the link indicating the home run may be sent.

In step 755, playback may be started from the event position. For example, the content segment corresponding to the manifest file entry 426 may be received, and the playback position for the event may be determined. As mentioned previously, the playback duration and the time offset for the manifest file entry may be used to determine the playback position. Then, playback may be started from the event position. For example, display of the home run may be caused. Thus, there may be a switching from causing display of the Rockies Baseball Game to a new content item, such as the Nationals Baseball Game.

In step 790, since display of a different content item, such as the Nationals baseball game, may be caused, the recording priorities may be updated. As mentioned previously, the recording capabilities may be limited. If the Nationals baseball game is being shown to the user, there may be a decision not to record the Nationals baseball game anymore. Instead of recording the Nationals baseball game, the recording capabilities may be used to record a different content item, such as the Cardinals baseball game or the Rockies baseball game. If recording of the Cardinals baseball game is being caused, when there is a switching from causing display of the Rockies baseball game to the Nationals baseball game, there may also be a switching from recording the Cardinals baseball game to the Rockies baseball game.

Returning back to step 740, if the event prompting the user to switch to a new content item has been recorded, a request for the content segment might not be sent. Rather, the method may move to step 760 and the recording may be retrieved from a recording device. For example, while the retrieved manifest file entry 426 may indicate a home run from a live transmission of the Nationals baseball game, the retrieved manifest file entry 416 may indicate a double play in the Nationals baseball game that occurred previously. Additionally, as mentioned above, a manifest file tag for the manifest file entry 416 may be received, for example, after the live transmission of the Nationals baseball game. For example, the user preferences may rank the highest event as a double play. In step 740, there may be a determination of whether the content segment comprising the double play has been recorded. If so, recorded content may be switched to and the method may move to step 760.

In step 760, the recorded content may be retrieved from the recording device. In step 770, the playback position in the recording may be determined. As mentioned previously in step 630, each manifest file entry may indicate a different playback position in the content item. For example, each content segment in the Nationals manifest file 406 may be ten seconds in duration. Therefore, there may be a determination that the content segment indicated by the manifest file entry 416 has a playback position starting at 10 seconds (e.g., after the first 10 second content segment indicated by the manifest file entry 411). The manifest file entry may include a time offset for the event. The playback duration and the time offset for the manifest file entry may be used to determine the playback position of the event. In step 780, the playback of the recorded content may be started from the playback position.

In step 790, the recording priorities may be updated. For example, as mentioned previously, the recording capabilities may be limited. Thus, as the recorded version of the Nationals baseball game is being shown to the user, there may be a decision to update the recording priorities. For example, instead of recording the Nationals baseball game, the recording capabilities may be used to record a different content item, such as the Cardinals baseball game or the Rockies baseball game. The method may move back to step 655.

There may be a determination of whether to transition to a different content item or remain watching the current content item (e.g., from step 640, 650, and/or FIG. 7), and the method may move back to step 655. In step 655, there may be a determination of whether to update the user preferences. For example, the user may decide a double play may be more interesting than a home run. As such, the user may update his/her user preferences using the graphical user interface 800 or 900. If there is a determination that the user has updated his/her user preferences, the method may move to step 520 and the process may repeat from there as described above. If there is a determination that the user has not updated his/her user preferences, the method may move back to step 605 and the process may repeat from there.

Additionally, and/or alternatively, the user preferences may indicate content providers and/or user preferred events. For example, referring to FIG. 8, the user preferences may indicate NBC, FOX, and ESPN. As mentioned above, NBC may be showing the Rockies game, FOX may be showing the Cardinals game, and ESPN may be showing the Nationals game. If NBC reaches a commercial break (e.g., when a manifest file entry indicating an insertion opportunity is detected), in step 645, the manifest file entry, indicating an insertion opportunity in the Rockies game, may be ranked after the manifest file entries for the Cardinals game and the Nationals game. In step 650, there may be a determination to interrupt the user from watching the Rockies game.

In step 710, the user may be prompted for an action. For example, the user may ignore the commercial break and remain watching the Rockies baseball game, and the method may move to step 655. The user may also wish to switch to a new content item, such as the second rated user preference content item, the Cardinals game being shown via FOX.

In step 740, there may be a determination of whether the Cardinals game has been recorded. Additionally, and/or alternatively, in step 740, the user may again be prompted whether to watch the recording of the Cardinals game or to the request a content segment from the live showing of the Cardinals game. For example, during commercial breaks of the Rockies game, the user may wish to watch the Cardinals baseball game from the beginning of the recording. The Cardinals baseball game may be retrieved from the DVR in step 760. In step 770, the playback position in the recording of the Cardinals baseball game (e.g., the beginning of the recording) may be determined. The playback of the Cardinals baseball game may be started in step 780. The method may move to step 790, the recording priorities updated, and step 655 returned to. If the user wants to watch the live showing of the Cardinals game, the method may move to step 750 and request the next content segment of the Cardinals game. The next content segment may be received. In step 755, the playback of the content segment may be started from the event position. The method may move to step 790.

Referring back to step 650, rather than determining whether to interrupt the current content item, the user may cause display of a second screen, such as by using a picture in picture feature. For example, if the user preference indicates FOX, NBC, and ESPN, display of the Rockies baseball game via FOX may be caused. If there is a determination that the Rockies baseball game is beginning a commercial break (e.g., detecting a manifest file entry indicating an insertion opportunity in step 640), display of the Cardinals baseball game via NBC may be caused using a first screen of the picture and picture feature, and the Rockies baseball game via FOX may be switched to a second screen. If the Rockies baseball game returns from the commercial break, the picture in picture feature may be removed and only the Rockies baseball game might be shown.

Additionally, and/or alternatively, if there is a determination that a content item, such as the Nationals baseball game, is showing a home run, causing display of the Rockies baseball game on the first screen of the picture in picture feature may be continued. Display of the home run in the Nationals baseball game may be caused on the second screen. If the home run event ends, showing of the picture in picture feature may be stopped and the Rockies baseball game may be returned to.

Additionally, and/or alternatively, the picture in picture feature may be used to show the top two content segments determined in step 645. For example, there may be a determination that the top manifest file entry is the manifest file entry 370 and the second manifest file entry is the manifest file entry 470. Using the picture in picture feature, display of both content segments may be caused. If applied to a picture-in-picture system that allows more than two simultaneous displays, display of any number of events on any available display may be caused.

Rather than using a HTTP live streaming manifest file (HLS manifest file), which is shown in FIG. 3, a Dynamic Adaptive Streaming over HTTP (MPEG-DASH) manifest file may be used to determine events within manifest files. The MPEG-DASH manifest file may be used similarly to the HLS manifest file to perform the methods described above. For example, similar to the HLS manifest file, event tags may be added to MPEG-DASH manifest files. By using these event tags within the MPEG-DASH manifest files, events and/or insertion opportunities may be identified. Based on the identified events and/or insertion opportunities, a different content item may be transitioned to. A similar strategy could be applied to any other current or future streaming media format.

The steps and/or other features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, other optical disk storage, magnetic cassettes, magnetic tape, magnetic storage, and the like.

Additionally, or alternatively, the steps and/or other features recited herein may be implemented through one or more Integrated Circuits (ICs). An IC may be, for example, a microprocessor that accesses programming instructions or other data stored in a ROM. A ROM may store program instructions that cause an IC to perform operations according to one or more of the methods described herein. One or more of the steps and/or other features described herein may be hardwired into an IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Although examples have been described herein, there are numerous variations and permutations of the above-described apparatuses, systems, and methods that are contained within the spirit and scope of the disclosure. One or more of the features described herein may be combined with any or all of the other features described herein, and/or with other features. The various features described above are merely non-limiting examples and may be rearranged, combined, subdivided, omitted, and/or altered in any desired manner. Various alterations, modifications, and improvements may occur to those skilled in art in view of the description and accompanying drawings. Such alterations, modifications, and improvements are intended to be part of this description, though not expressly stated herein, and are intended to be within the spirit and scope of the disclosure. Accordingly, the foregoing description and accompanying drawings are by way of example only, and not limiting.

What is claimed is:

1. An apparatus comprising:
one or more processors; and
memory storing instructions that, when executed by the one or more processors, cause the apparatus to:
based on an indication of a first event in a first entry in a first manifest file associated with a first content item, switch output from the first content item to a second content item; and
after switching output to the second content item:
monitor a plurality of manifest files associated with a plurality of content items; and
based on an indication of a second event in a second entry in a manifest file of the plurality of manifest files, switch output to a content item associated with the manifest file.

2. The apparatus of claim 1, wherein the first event comprises advertisement information.

3. The apparatus of claim 1, wherein the manifest file comprises one of:
the first manifest file; or
an other manifest file of the plurality of manifest files.

4. The apparatus of claim 1, wherein the instructions, when executed by the one or more processors, further cause the apparatus to switch output to the content item by:
determining that the second entry indicates a user preferred event.

5. The apparatus of claim 1, wherein the instructions, when executed by the one or more processors, further cause the apparatus to switch output to the content item by:
determining that the second entry is a highest-ranked entry of a plurality of entries associated with upcoming content segments in the plurality of content items.

6. The apparatus of claim 1, wherein the instructions, when executed by the one or more processors, further cause the apparatus to switch output to the second content item by:
   causing output of the second content item; and
   changing, based on the indication of the first event, a recording task from recording the second content item to recording a different content item.

7. The apparatus of claim 1, wherein the instructions, when executed by the one or more processors, further cause the apparatus to:
   determine, from the plurality of manifest files, a plurality of entries associated with upcoming content segments in the plurality of content items; and
   rank, based on user preferences, the plurality of entries; and
   wherein the instructions, when executed by the one or more processors, further cause the apparatus to switch output to the content item by:
      causing output of the content item based on the ranked plurality of entries.

8. The apparatus of claim 1, wherein plurality of content items comprises the first content item and at least one other content item.

9. A method comprising:
   based on an indication of a first event in a first entry in a first manifest file associated with a first content item, switching, by a computing device, output from the first content item to a second content item; and
   after switching output to the second content item:
      monitoring a plurality of manifest files associated with a plurality of content items; and
      based on an indication of a second event in a second entry in a manifest file of the plurality of manifest files, switching output to a content item associated with the manifest file.

10. The method of claim 9, wherein the first event comprises advertisement information.

11. The method of claim 9, wherein the manifest file comprises one of:
   the first manifest file; or
   an other manifest file of the plurality of manifest files.

12. The method of claim 9, wherein the switching output to the content item comprises:
   determining that the second entry indicates a user preferred event.

13. The method of claim 9, wherein the switching output to the content item comprises:
   determining that the second entry is a highest-ranked entry of a plurality of entries associated with upcoming content segments in the plurality of content items.

14. The method of claim 9, wherein the switching output to the second content item comprises:
   causing output of the second content item; and
   changing, based on the indication of the first event, a recording task from recording the second content item to recording a different content item.

15. The method of claim 9, further comprising:
   determining, from the plurality of manifest files, a plurality of entries associated with upcoming content segments in the plurality of content items; and
   ranking, based on user preferences, the plurality of entries, wherein the switching output to the content item comprises causing output of the content item based on the ranked plurality of entries.

16. The method of claim 9, wherein plurality of content items comprises the first content item and at least one other content item.

17. One or more non-transitory computer readable media storing instructions that, when executed, cause:
   based on an indication of a first event in a first entry in a first manifest file associated with a first content item, switching output from the first content item to a second content item; and
   after switching output to the second content item:
      monitoring a plurality of manifest files associated with a plurality of content items; and
      based on an indication of a second event in a second entry in a manifest file of the plurality of manifest files, switching output to a content item associated with the manifest file.

18. The one or more non-transitory computer readable media of claim 17, wherein the first event comprises advertisement information.

19. The one or more non-transitory computer readable media of claim 17, wherein the manifest file comprises one of:
   the first manifest file; or
   an other manifest file of the plurality of manifest files.

20. The one or more non-transitory computer readable media of claim 17, wherein the instructions, when executed, further cause the switching output to the content item by:
   determining that the second entry indicates a user preferred event.

21. The one or more non-transitory computer readable media of claim 17, wherein the instructions, when executed, further cause the switching output to the content item by:
   determining that the second entry is a highest-ranked entry of a plurality of entries associated with upcoming content segments in the plurality of content items.

22. The one or more non-transitory computer readable media of claim 17, wherein the instructions, when executed, further cause the switching output to the second content item by:
   causing output of the second content item; and
   changing, based on the indication of the first event, a recording task from recording the second content item to recording a different content item.

23. The one or more non-transitory computer readable media of claim 17, wherein the instructions, when executed, further cause:
   determining, from the plurality of manifest files, a plurality of entries associated with upcoming content segments in the plurality of content items; and
   ranking, based on user preferences, the plurality of entries, wherein the switching output to the content item comprises causing output of the content item based on the ranked plurality of entries.

24. A system comprising:
   a computing device; and
   a server;
   wherein the computing device is configured to:
      based on an indication of a first event in a first entry in a first manifest file received from the server and associated with a first content item, switch output from the first content item to a second content item; and
      after switching output to the second content item:
         monitor a plurality of manifest files associated with a plurality of content items; and
         based on an indication of a second event in a second entry in a manifest file of the plurality of manifest files, switch output to a content item associated with the manifest file.

25. The system of claim 24, wherein the first event comprises advertisement information.

26. The system of claim 24, wherein the manifest file comprises one of:
   the first manifest file; or
   an other manifest file of the plurality of manifest files.

27. The system of claim 24, wherein the computing device is configured to switch output to the content item by:
   determining that the second entry indicates a user preferred event.

28. The system of claim 24, wherein the computing device is configured to switch output to the content item by:
   determining that the second entry is a highest-ranked entry of a plurality of entries associated with upcoming content segments in the plurality of content items.

29. The system of claim 24, wherein the computing device is configured to switch output to the second content item by:
   causing output of the second content item; and
   changing, based on the indication of the first event, a recording task from recording the second content item to recording a different content item.

30. The system of claim 24, wherein the computing device is configured to:
   determine, from the plurality of manifest files, a plurality of entries associated with upcoming content segments in the plurality of content items; and
rank, based on user preferences, the plurality of entries, wherein the switching output to the content item comprises causing output of the content item based on the ranked plurality of entries.

* * * * *